United States Patent
Kornerup et al.

(10) Patent No.: US 8,117,588 B2
(45) Date of Patent: Feb. 14, 2012

(54) SPATIAL ITERATION NODE FOR A GRAPHICAL PROGRAM

(75) Inventors: Jacob Kornerup, Austin, TX (US); Andrew P. Dove, Austin, TX (US); Joel Sumner, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1556 days.

(21) Appl. No.: 11/465,393

(22) Filed: Aug. 17, 2006

(65) Prior Publication Data
US 2007/0044073 A1 Feb. 22, 2007

Related U.S. Application Data

(60) Provisional application No. 60/709,413, filed on Aug. 18, 2005.

(51) Int. Cl.
*G06F 9/44* (2006.01)
*G06F 9/445* (2006.01)
(52) U.S. Cl. ........ 717/105; 717/104; 717/106; 717/109; 717/113; 717/125; 717/174; 717/177
(58) Field of Classification Search .................. None
See application file for complete search history.

(56) References Cited

U.S. PATENT DOCUMENTS

| | | | |
|---|---|---|---|
| 4,914,568 A | 4/1990 | Kodosky | |
| 6,802,053 B1 | 10/2004 | Dye | |
| 7,062,718 B2 | 6/2006 | Kodosky | |
| 7,134,090 B2 * | 11/2006 | Kodosky et al. | 715/769 |
| 2005/0235290 A1 | 10/2005 | Jefferson | |

* cited by examiner

*Primary Examiner* — Lewis Bullock, Jr.
*Assistant Examiner* — Mark Gooray
(74) *Attorney, Agent, or Firm* — Meyertons, Hood, Kivlin, Kowert & Goetzel P.C.; Jeffrey C. Hood; Jason L. Burgess

(57) ABSTRACT

A system and method for creating a distributed application using graphical programming techniques are disclosed. The distributed application may comprise a first graphical program and a second graphical program, where a host computer system executes the first graphical program, and a plurality of remote computer systems or computing devices each execute an instance of the second graphical program. In some embodiments the first graphical program may utilize a node that represents the second graphical program. The node may be operable to exchange data with a plurality of instances of the second graphical program executing on a plurality of remote devices.

19 Claims, 17 Drawing Sheets

SPATIAL ITERATION NODE FOR A GRAPHICAL PROGRAM

PRIORITY CLAIM

This application claims priority to U.S. provisional patent application No. 60/709,413, titled "Spatial Iterator Structure Node for a Graphical Program," filed on Aug. 18, 2005, whose inventors were Jacob Kornerup, Andrew Dove, and Joel Sumner.

FIELD OF THE INVENTION

The present invention relates to the field of graphical programming. More particularly, the invention relates to a node in a graphical program, where the node represents another graphical program, and where the node is operable to exchange data with a plurality of instances of the other graphical program executing on a plurality of remote devices.

DESCRIPTION OF THE RELATED ART

Traditionally, high level text-based programming languages have been used by programmers in writing application programs. Many different high level text-based programming languages exist, including BASIC, C, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY

Various embodiments of a system and method for creating a distributed application using graphical programming techniques are described herein. The distributed application may comprise a first graphical program and a second graphical program, where a host computer system executes the first graphical program, and a plurality of remote computer systems or computing devices each execute an instance of the second graphical program.

In some embodiments the first graphical program may utilize a node that represents the second graphical program. The node may be operable to exchange data with a plurality of instances of the second graphical program executing on a plurality of remote devices.

BRIEF DESCRIPTION OF THE DRAWINGS

A better understanding of the invention can be obtained when the following detailed description is considered in conjunction with the following drawings, in which.

Figure 1:
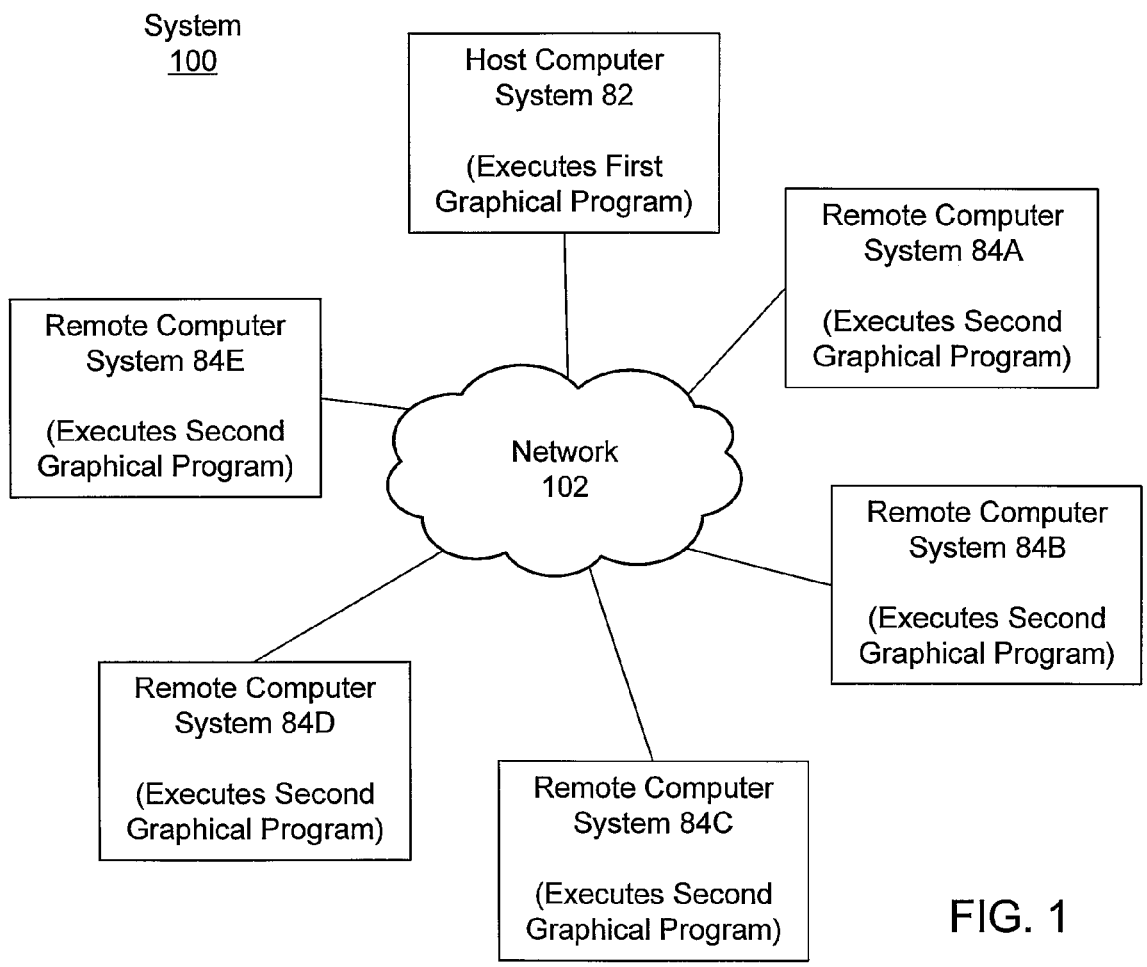
FIG. 1 illustrates a system in which a host computer system is coupled to a plurality of remote computer systems, where the host computer system executes a first graphical program, and each remote computer system executes an instance of a second graphical program.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,901,221 titled "Graphical System for Modeling a Process and Associated Method," issued on Feb. 13, 1990.

U.S. Pat. No. 5,481,741 titled "Method and Apparatus for Providing Attribute Nodes in a Graphical Data Flow Environment".

U.S. Pat. No. 5,732,277 titled "Graphical Programming System and Method Which Includes Icons for Performing Iteration/Looping, Conditional Branching and Sequencing Operations," issued on Mar. 24, 1998.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/976,726 titled, "System and Method for Enabling a Graphical Program to Respond to User Interface Events," filed Oct. 12, 2001.

U.S. patent application Ser. No. 09/832,997 titled, "System and Method for Creating a Graphical Program Including a Plurality of Portions to be Executed Sequentially," filed Apr. 10, 2001.

U.S. patent application Ser. No. 10/892,829 titled, "A Graphical Program Which Executes a Timed Loop," filed Jul. 16, 2004.

U.S. patent application Ser. No. 11/206,249 titled "Deterministic Communication between Graphical Programs Executing on Different Computer Systems," filed Aug. 17, 2005.

U.S. patent application Ser. No. 11/203,816 titled "Combination Structure Nodes for a Graphical Program," filed Aug. 15, 2005.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, sensor device with processor and memory, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Various embodiments of a system and method for creating a distributed application using graphical programming techniques are described herein. The distributed application may comprise a plurality of graphical programs that execute on a plurality of computer systems. More particularly, the distributed application may comprise a first graphical program and a second graphical program, where a host computer system 82 executes the first graphical program, and a plurality of remote computer systems 84 each execute an instance of the second graphical program.

FIG. 1 illustrates a system 100 in which the host computer system 82 is coupled to the plurality of remote computer systems 84 via a network 102. The remote computer systems 84 are termed "remote" computer systems because they are remote with respect to the host computer system 82, i.e., they are different computer systems that are coupled to the host computer system 82 via the network 102.

The host computer system 82 executes the first graphical program (also referred to herein as the host graphical program), and each remote computer system 84 executes the second graphical program (also referred to herein as the remote graphical program). In other words, each remote computer system 84 executes an instance of the second graphical program. In some embodiments the remote computer systems 84 may execute their respective instances of the second graphical program in parallel with each other. For example, as described below, in some embodiments the first graphical program may initiate the execution of the instances of the second graphical program on the remote computer systems 84 such that the instances of the second graphical program begin execution on the remote computer systems 84 at the same time.

The first graphical program may execute on the host computer system 82 to exchange data with the instances of the second graphical program executing on the remote computer systems 84. For example, the first graphical program may send data to and/or receive data from the instances of the second graphical program. For example, data may be passed from the first graphical program executing on the host computer system 82 to the second graphical program executing on each of the remote computer systems 84. Also, data may be passed from the second graphical program executing on each of the remote computer systems 84 to the first graphical program executing on the host computer system 82. For example, data from the instances of the second graphical program may be aggregated and used by the first graphical program to perform various kinds of applications.

A graphical programming development environment may include features for creating a distributed application that operates as described above. The graphical programming development environment may include features allowing users to easily develop the first graphical program and the second graphical program. For example, the graphical programming development environment may provide one or more specialized nodes that enable a user to easily create a first graphical program operable to exchange data with a plurality of instances of a second graphical program executing on a plurality of remote computer systems. In some embodiments a specialized node may have a visual appearance that makes it easy for viewers to understand that the first graphical program performs communication with a plurality of instances of the second graphical program. One embodiment of a node referred to herein as a "spatial iterator structure node" or simply "spatial iterator node" is described below.

The graphical programming development environment may also include features to aid users in deploying the second graphical program to the plurality of remote computer systems 84. For example, in some embodiments the user may select the remote computer systems 84 desired to execute the second graphical program, and the graphical programming development environment may automatically deploy the second graphical program to the remote computer systems 84. Features of the graphical programming development environment that aid users in creating and deploying the distributed application are further described below.

Referring again to FIG. 1, in this example, the system 100 includes remote computer systems 84A-84E, although in various embodiments any number of remote computer systems 84 may be present. It is noted that throughout this disclosure, drawing features identified by the same reference number followed by a letter (e.g., remote computer systems 84A-84E) may be collectively referred to by that reference number alone (e.g., remote computer systems 84) where appropriate.

In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, the various computer systems in the system 100 may each be coupled to the network 102 using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 2:
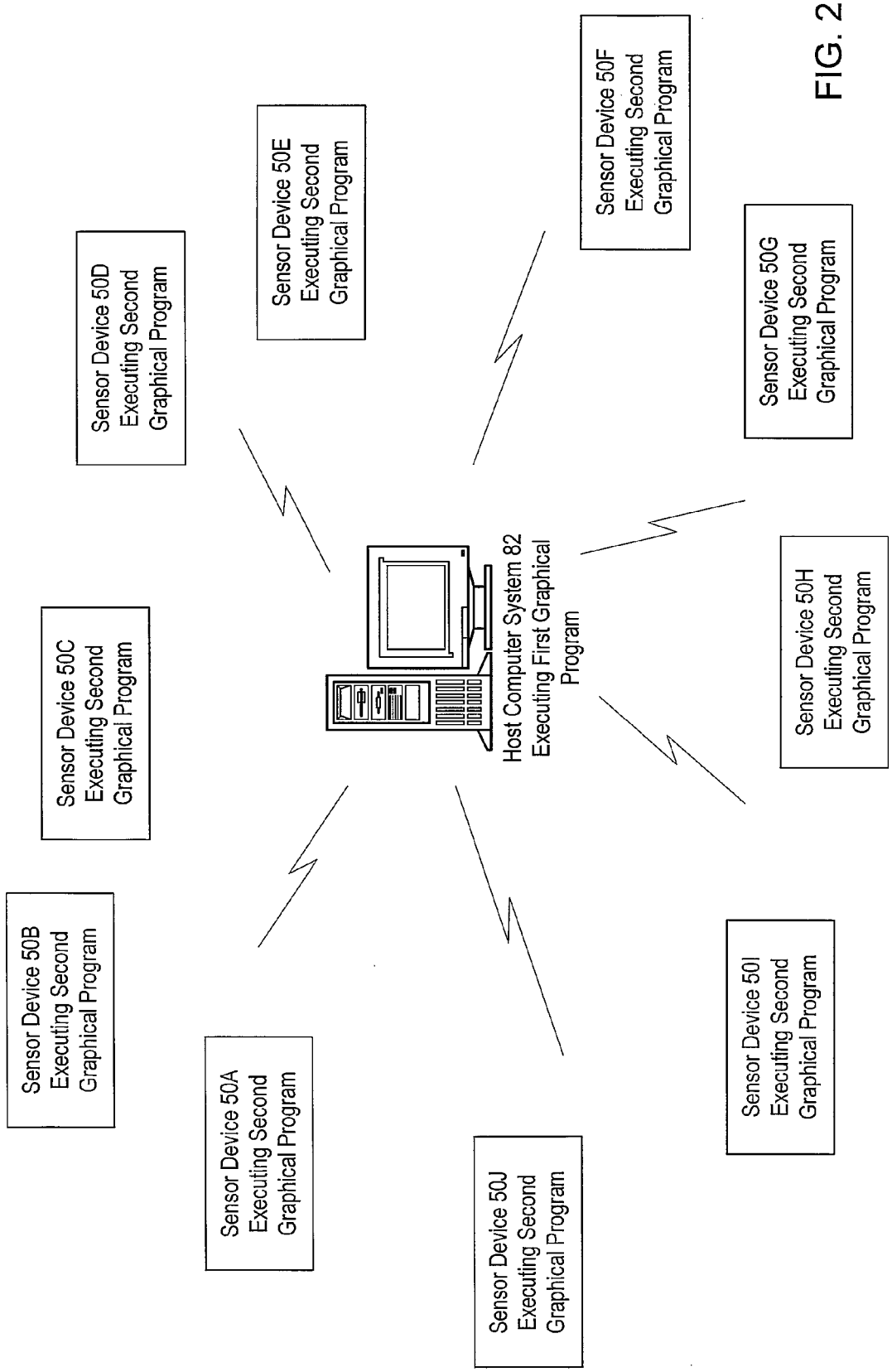
FIG. 2 illustrates an embodiment in which each remote computer system is a sensor device in a wireless sensor network.

The host computer system 82 and the remote computer systems 84 may each comprise any type of computer system or device. FIG. 2 illustrates an embodiment in which each remote computer system 84 is a sensor device 50 in a wireless sensor network 45. The sensor devices 50 may be spatially distributed with respect to each other, possibly over a wide area. Each sensor device 50 may include a sensor 52 for sensing or measuring physical properties such as temperature, sound, vibration, pressure, motion, pollutants, etc. The sensor devices 50 are typically small and inexpensive, so that they can be produced and deployed in large numbers for a relatively low cost.

In this example, the host computer system 82 executes the first graphical program, and each sensor device 50 executes an instance of the second graphical program. As described below, a user may create the graphical code for the first graphical program and the second graphical program, e.g., by interacting with a graphical programming development environment. In one embodiment the user may interact with the graphical programming development environment on the host computer 82, e.g., the graphical programming development environment may execute on the host computer 82. Once the user has developed the application, the graphical programming development environment may be operable to automatically deploy the second graphical program on the sensor devices 50. For example, the graphical programming development environment may perform wireless communication with the sensor devices 50 to send the second graphical program to each sensor device 50 using a wireless communication protocol.

In another embodiment the user may interact with the graphical programming development environment on a development computer system that is different from the host computer 82 and the sensor devices 50. In this embodiment the graphical programming development environment may be operable to automatically deploy the first graphical program on the host computer 82 and automatically deploy the second graphical program on the sensor devices 50.

The first graphical program may execute on the host computer system 82 to exchange data with the second graphical program executing on each of the sensor devices 50 using wireless communication. In various embodiments any kind of wireless communication protocol may be used to send data from the first graphical program to each of the instances of the second graphical program and/or to send data from each of the instances of the second graphical program to the first graphical program.

The first graphical program on the host computer system 82 may communicate with the instances of the second graphical program on the sensor devices 50 to perform any of various kinds of applications. For example, each sensor device 50 may be located in a respective location and may execute the second graphical program to perform a monitoring function at its respective location, e.g., to monitor physical properties such as temperature, sound, vibration, pressure, motion, pollutants, etc. The first graphical program may communicate with the instances of the second graphical program executing on the sensor devices 50 to collect and analyze the physical data to perform any of various kinds of applications. For example, the physical data may be monitored in applications such as video surveillance, traffic monitoring, air traffic control, robotics, home monitoring, environmental monitoring, manufacturing, industrial automation, process control, etc.

The first graphical program executing on the host computer system 82 may also control operation of the instances of the second graphical program on the sensor devices 50 in various ways. For example, the first graphical program may broadcast a command to the second graphical program on each of the sensor devices 50 to cause them to start monitoring their environment. In response to the command, each sensor device 50 may begin executing the second graphical program. Thus, the sensor devices 50 may execute their respective instances of the second graphical program in parallel with each other.

Figure 3:
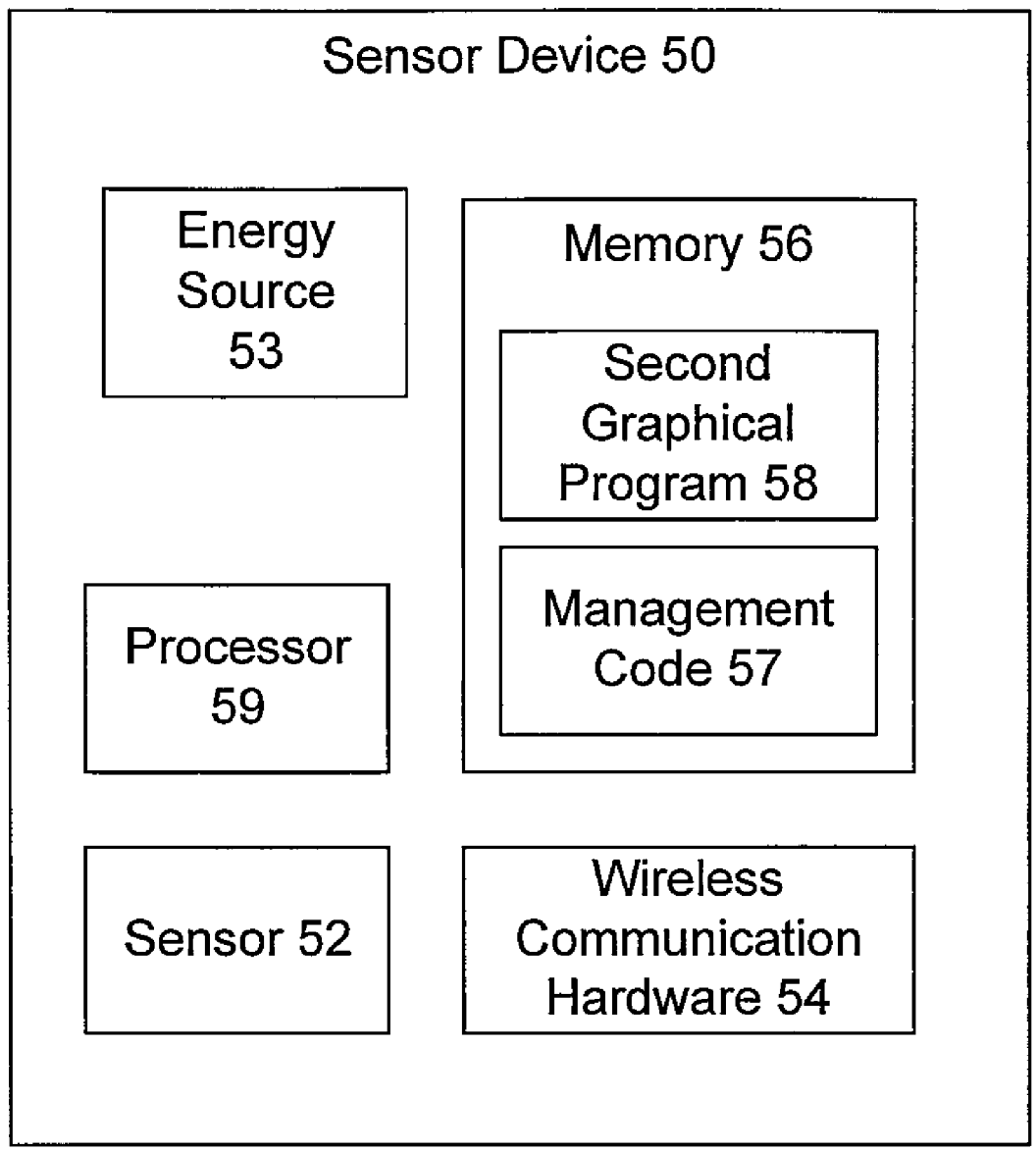
FIG. 3 illustrates a block diagram of an exemplary sensor device.

In various embodiments the sensor devices 50 may comprise devices of any kind. The sensor devices 50 may be small in size so that they can be unobtrusively placed in many locations. FIG. 3 illustrates a block diagram of an exemplary sensor device 50 according to one embodiment. As shown, the sensor device 50 includes a sensor 52. The sensor 52 may comprise a sensor suitable for sensing or measuring a signal or physical phenomenon of any kind, such as temperature, sound, vibration, pressure, motion, chemicals, etc. The sensor device 50 may also include wireless communication hardware 54 operable to perform wireless communication with the host computer 82. The sensor device may also include an energy source 53, such as a battery.

The sensor device 50 also includes memory 56 that stores the second graphical program 58. The memory 56 may also store management code 57 operable to manage the second graphical program 58. For example, the management code 57 may communicate with the graphical programming development environment executing on the host computer system 82 (or a different development computer system) to receive the second graphical program 58 and store the second graphical program 58 in the memory 56. The sensor device 50 may also include a processor 59 operable to execute the management code 57 and the second graphical program 58.

Figure 4:
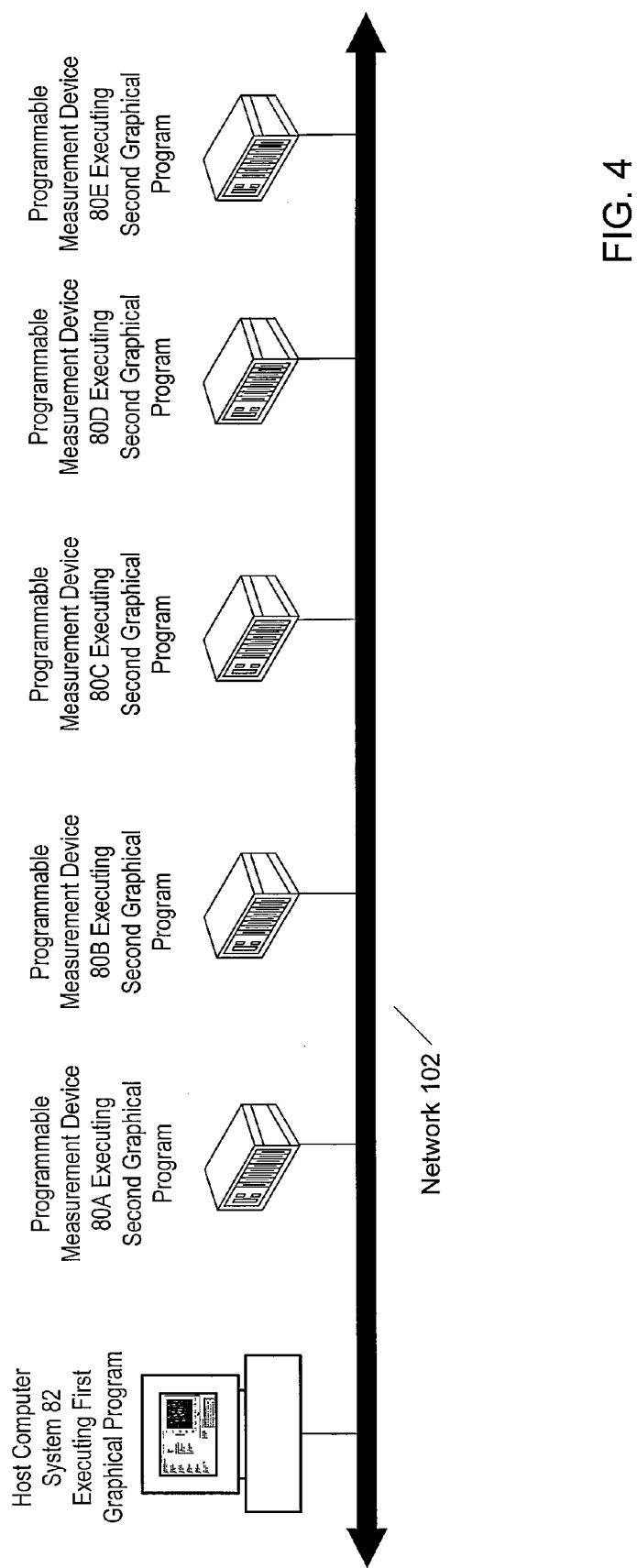
FIG. 4 illustrates an embodiment in which each remote computer system is a programmable measurement device.

In other embodiments of the system 100, the second graphical program may be executed on computer systems or computing devices other than sensor devices and/or may be coupled to the host computer 82 through ways other than through a wireless network. For example, FIG. 4 illustrates an exemplary embodiment in which the second graphical program is executed by a plurality of programmable measurement devices 80. In this example, the network 102 comprises a non-wireless network through which the programmable measurement devices 80 are coupled to the host computer system 82. Each programmable measurement device 80 may include programmable hardware, such as an FPGA device, which is programmed to execute the second graphical program. For example, the graphical programming development environment may execute on the host computer system 82 to generate a hardware configuration program from the second graphical program and may communicate with the programmable measurement devices 80 to configure their programmable hardware using the hardware configuration program. The host computer 82 may execute the first graphical program to exchange data with the instances of the second graphical program executing on the programmable measurement devices 80 in order to perform any of various applications involving measurement of physical signals or physical variables.

Exemplary Systems

Embodiments of a distributed application such as described herein may be involved with performing test and/or measurement functions; controlling and/or modeling instrumentation or industrial automation hardware; modeling and simulation functions, e.g., modeling or simulating a device or product being developed or tested, etc.

However, it is noted that the present invention can be used for a plethora of applications and is not limited to the above applications. In other words, applications discussed in the present description are exemplary only, and the present invention may be used in any of various types of systems. Thus, graphical programs as described herein may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 5:
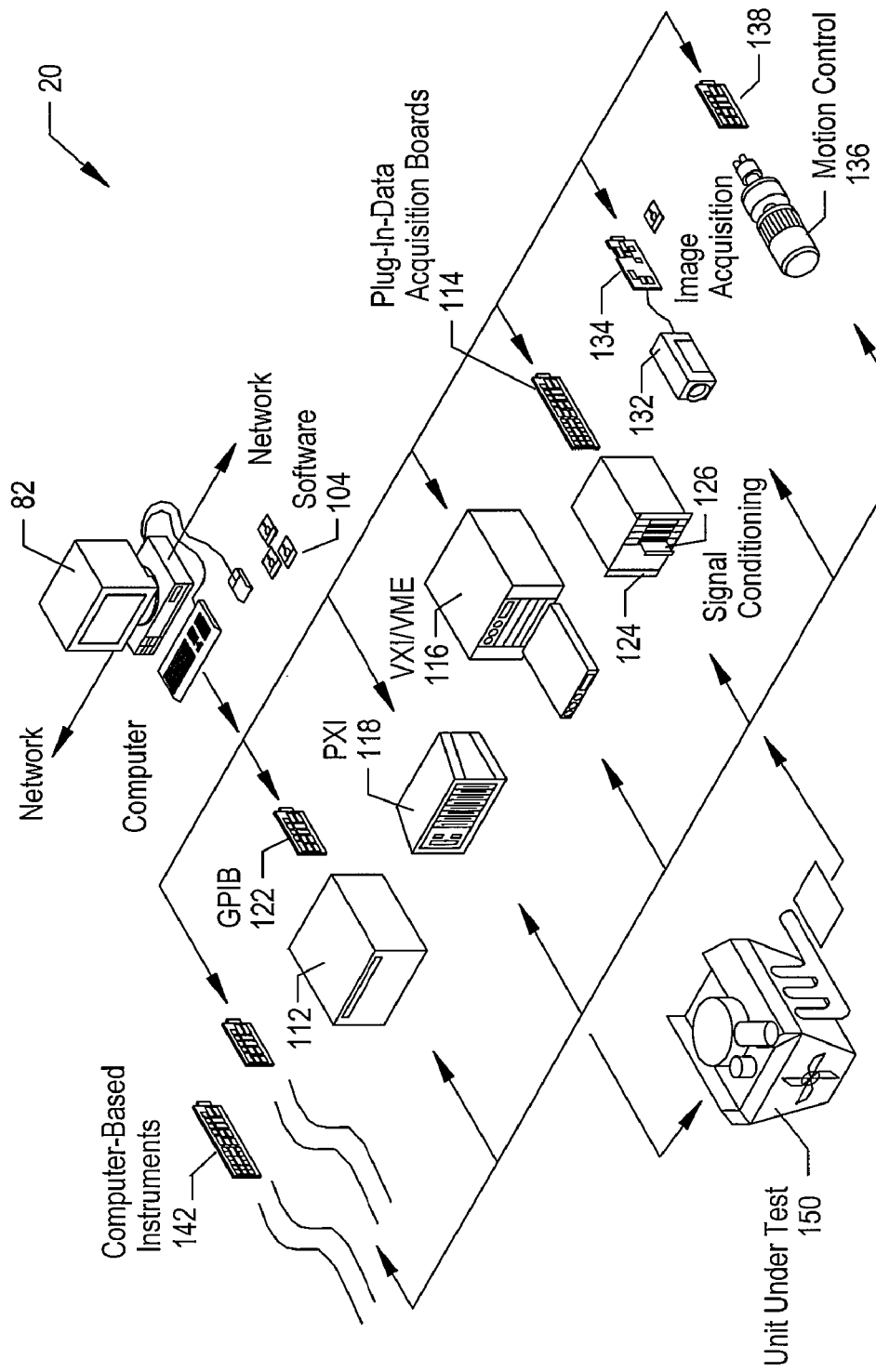
FIG. 5 illustrates an exemplary instrumentation control system.

In some embodiments a distributed application such as described herein may be used to control one or more instruments. For example, FIG. 5 illustrates an exemplary instrumentation control system 20. The system 20 comprises the host computer system 82 which connects to one or more instruments. The host computer system 82 may comprise a CPU, a display screen, memory, and one or more input devices, such as a mouse or keyboard as shown.

In some embodiments the host computer system 82 may execute the first graphical program to operate with one or more instruments such as shown in FIG. 5. In some embodiments the first graphical program may control operation of the one or more instruments based on data received from the instances of the second graphical program executing on remote computer systems 84. For example, in one embodiment the first graphical program may analyze, measure or control a unit under test (UUT) or process 150 based on the data received from the instances of the second graphical program.

In other embodiments, one or more of the remote computer systems 84 may execute the second graphical program to operate with one or more instruments such as shown in FIG. 5. For example, in one embodiment, each instance of the second graphical program may analyze, measure or control a respective unit under test (UUT) or process 150 based on data received from the first graphical program.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system 82 may couple to and operate with one or more of these instruments. The instruments may be coupled to a unit under test (UUT) or process 150, or may be coupled to receive field signals, typically generated by transducers. The system 20 may be used in a data acquisition and control application, in a test and measurement application, an image processing or machine vision application, a process control application, a man-machine interface application, a simulation application, or a hardware-in-the-loop validation application, among other types of applications.

Figure 6:
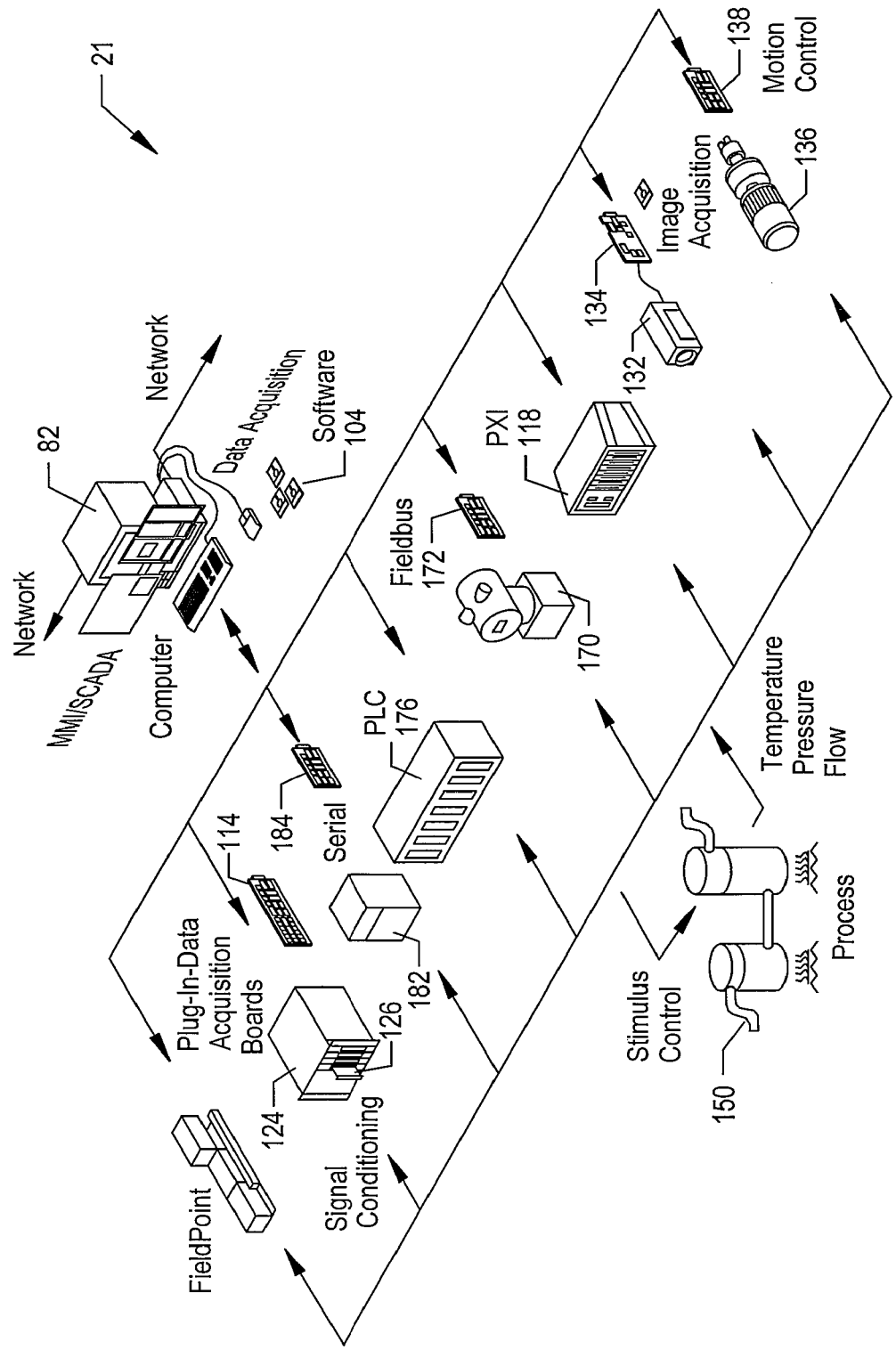
FIG. 6 illustrates an exemplary industrial automation system.

In some embodiments a distributed application such as described herein may be used for industrial automation. For example, FIG. 6 illustrates an exemplary industrial automation system 21. The industrial automation system 21 is similar to the instrumentation or test and measurement system 20 shown in FIG. 5. Elements which are similar or identical to elements in FIG. 5 have the same reference numerals for convenience. The system 21 may comprise a host computer system 82 which connects to one or more devices or instruments. The computer 82 may comprise a CPU, a display screen, memory, and one or more input devices such as a mouse or keyboard as shown.

In some embodiments the host computer system 82 may execute the first graphical program to operate with one or more devices such as shown in FIG. 6 to a process or device 150 to perform an automation function. In some embodiments the first graphical program may perform the automation function based on data received from the instances of the second graphical program executing on remote computer systems 84. For example, in one embodiment the first graphical program may perform an automation function, such as MMI (Man Machine Interface), SCADA (Supervisory Control and Data Acquisition), portable or distributed data acquisition, process control, advanced analysis, or other control.

In other embodiments, one or more of the remote computer systems 84 may execute the second graphical program to operate with one or more devices such as shown in FIG. 6 to a process or device 150 to perform an automation function. For example, in one embodiment, each instance of the second graphical program may perform an automation function based on data received from the first graphical program.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the exemplary systems shown in FIGS. 5 and 6, one or more of the various instruments or devices may couple to each other over a network, such as the Internet, an Intranet, or a LAN.

Graphical programs which perform data acquisition, analysis and/or presentation, e.g., for measurement, instrumentation control, industrial automation, modeling, or simulation, such as in the applications shown in FIGS. 5 and 6, may be referred to as virtual instruments.

Figure 7:
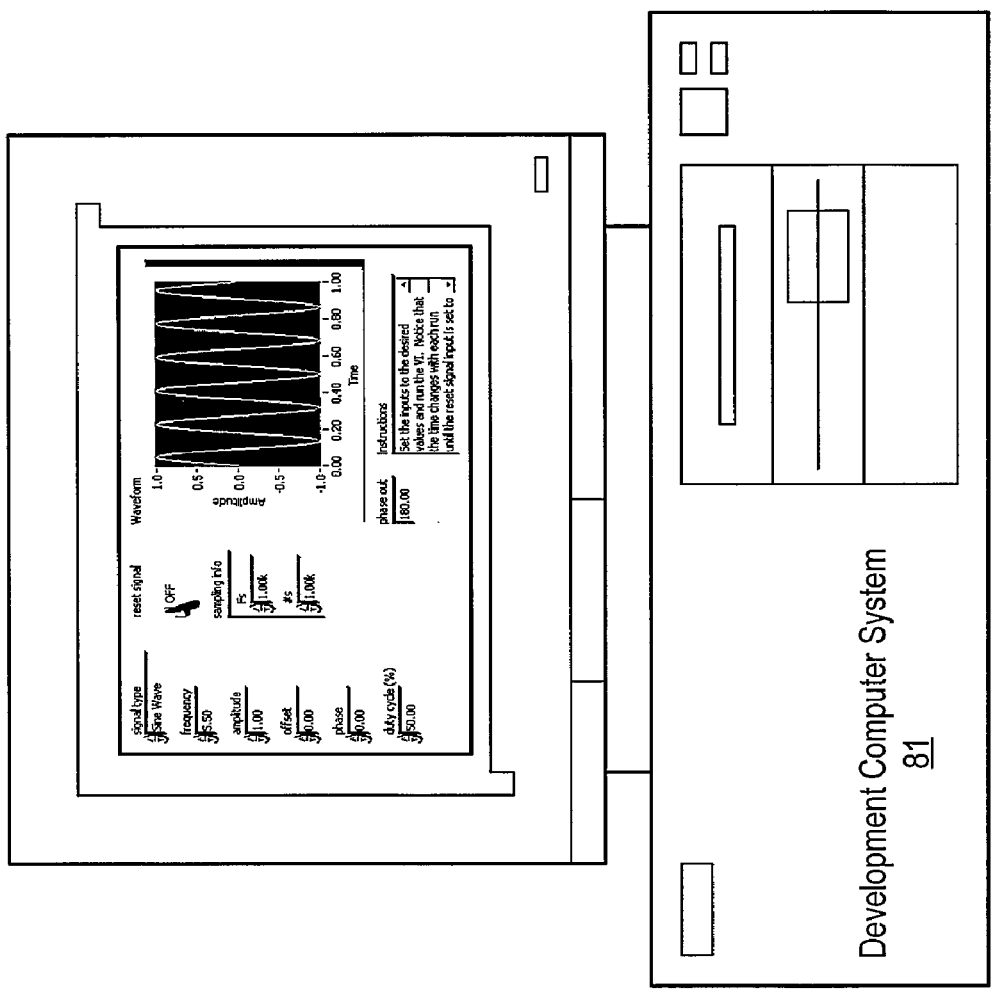
FIG. 7 illustrates an exemplary development computer system which may execute a graphical programming development environment software application used to create the first graphical program and the second graphical program.
Figure 8:
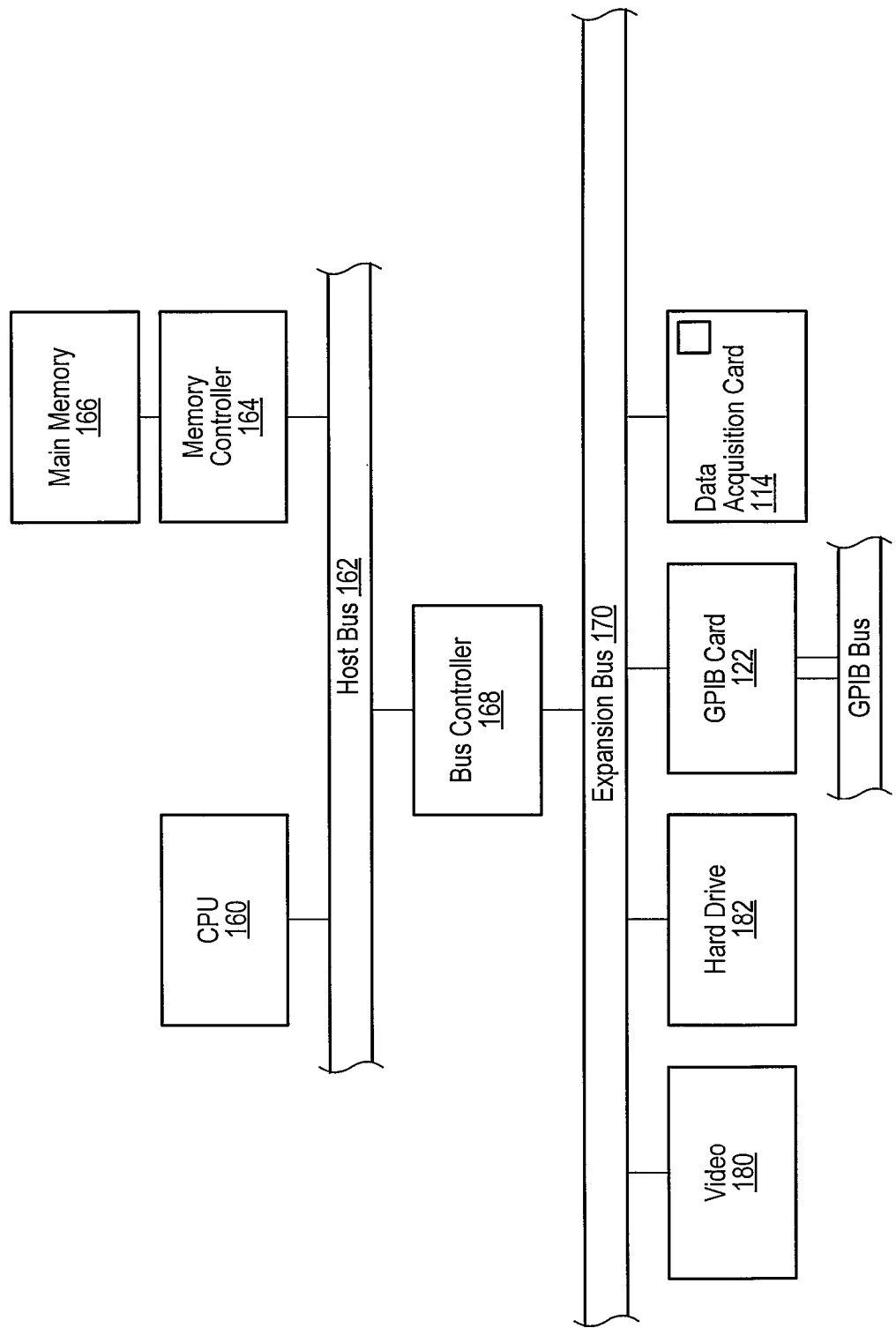
FIG. 8 is a block diagram representing one embodiment of the development computer system.

FIGS. 7 and 8—Development Computer System

As noted above, a graphical programming development environment may include features for aiding users in creating distributed applications such as described herein, e.g., for simplifying the creation of the first graphical program and the second graphical program and for deploying the second graphical program to the remote computer systems 84. The graphical programming development environment may comprise a software application which executes to enable users to create graphical programs, e.g., by arranging nodes in a block diagram. FIG. 7 illustrates an exemplary development computer system 81 which may execute the graphical programming development environment software application.

In one embodiment the development computer system 81 may be the same as the host computer 82. In other words, the first graphical program and the second graphical program may be developed on the same computer system that eventually executes the first graphical program. In another embodiment the development computer system 81 may be different from the host computer 82. In other words, the first graphical program and the second graphical program may be developed on the development computer system 81, and the first graphical program may be deployed for execution on a different host computer system 82. In either case, the second graphical program is preferably deployed onto multiple remote computer systems or computing devices 84 which are different from both the development computer system 81 and the host computer system 82.

The development computer system 81 may include a display device operable to display a graphical program as it is being created. In particular, the graphical programming development environment may display a block diagram representing the first graphical program and/or the second graphical program. As described below, in some embodiments both the first graphical program and the second graphical program may be represented by a single block diagram. In other embodiments, the first graphical program and the second graphical program may be represented by different block diagrams. The display device of the development computer system 81 (or a display device of a different host computer system 82) may also be operable to display a graphical user interface or front panel of the first graphical program during execution of the first graphical program.

The development computer system 81 may include a memory medium(s) on which one or more computer programs or software components according to one embodiment of the present invention may be stored. In particular, the memory medium may store a graphical programming development environment software application used to create the first graphical program and the second graphical program. The graphical programming development environment may include a spatial iterator node such as described below or other specialized graphical program nodes that enable a user to easily create the first graphical program and the second graphical program. The memory medium may also store operating system software, as well as other software for operation of the computer system.

The memory medium may also store the first graphical program and the second graphical program created in response to user input to the graphical programming development environment. For example, the first graphical program and the second graphical program may be stored as one or more data structures.

FIG. 8 is a block diagram representing one embodiment of the development computer system 81 in more detail. In some embodiments, FIG. 8 may also represent the host computer system 82 that executes the first graphical program. It is noted that any type of computer system configuration or architecture can be used as desired, and FIG. 8 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store software such as described above with reference to FIG. 7.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. In the illustrated embodiment, the computer 81 further comprises a video display subsystem 180 and hard drive 182 coupled to the expansion bus 170.

Figure 9:
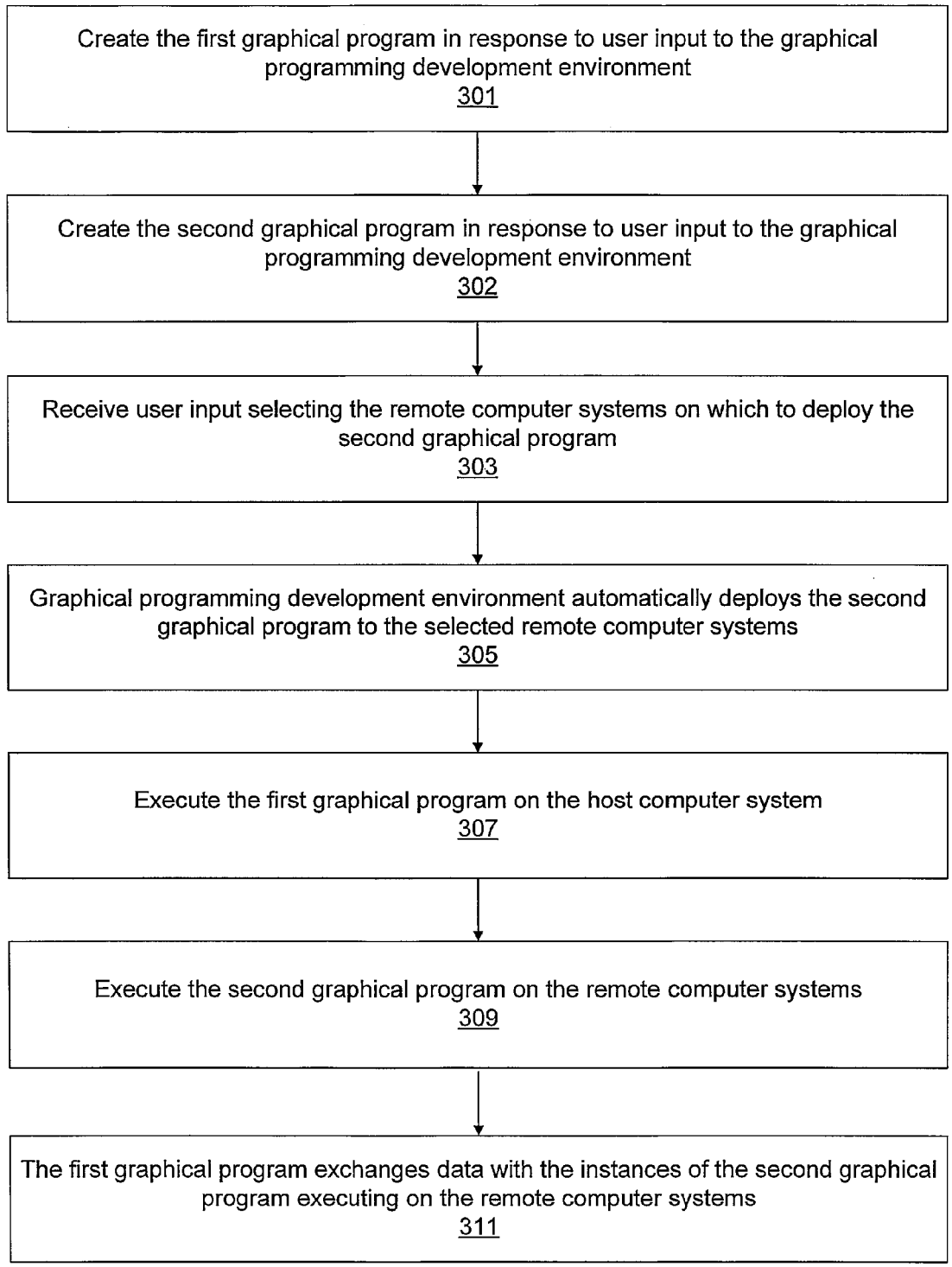
FIG. 9 is a flowchart diagram illustrating one embodiment of a method for creating and executing the first graphical program and the second graphical program.

FIG. 9 is a flowchart diagram illustrating one embodiment of a method for creating and executing a distributed application such as described above. It is noted that the flowchart of FIG. 9 represents an exemplary embodiment, and in alternative embodiments, various elements may be combined, omitted, or performed in different orders.

In 301, the first graphical program may be created in response to user input to the graphical programming development environment. Creating the first graphical program may comprise creating a first block diagram representing the first graphical program, e.g., where the first block diagram is displayed on the display of the development computer system 81. Creating the first block diagram for the first graphical program may comprise assembling and interconnecting a plurality of nodes or icons in the first block diagram in response to user input. For example, the user may create the first block diagram by selecting desired icons or nodes from a palette or menu of available nodes and placing or "dragging and dropping" the selected nodes into the first block diagram. The user may also interconnect the nodes in the first block diagram in a desired fashion. The nodes may be interconnected according to one or more of data flow, control flow, and/or execution flow representations. The plurality of nodes in the first block diagram may be interconnected in response to user input in order to visually indicate desired functionality of the first graphical program. For example, the plurality of interconnected nodes may visually indicate a process or function performed by the first graphical program.

In some embodiments the first graphical program may also include a user interface portion or front panel portion. Where the graphical program includes a user interface portion, the user may assemble the user interface on the display, e.g., by arranging various user interface elements on the display.

In 302, the second graphical program may be created in response to user input to the graphical programming development environment. Creating the second graphical program may comprise creating a second block diagram representing the second graphical program, similarly as described above with respect to 301.

In some embodiments the first graphical program and the second graphical program may be represented by different block diagrams, e.g., where the first block diagram and the second block diagram are created separately from each other and are separately displayable from each other. In other embodiments the first graphical program and the second graphical program may both be represented in a single block diagram, e.g., where the single block diagram visually indicates functionality of both the first graphical program and the second graphical program. For example, the second block diagram representing the second graphical program may be displayed within the first block diagram as a sub-diagram of the first block diagram.

Creating the first graphical program and the second graphical program in 301 and 302 may comprise configuring the graphical programs to exchange data, e.g., configuring the first graphical program to pass data to the second graphical program and/or configuring the first graphical program to receive data from the second graphical program. Exemplary techniques for configuring the graphical programs to exchange data are described below.

In 303, user input selecting the desired remote computer systems or computing devices on which to deploy the second graphical program may be received. In various embodiments the graphical programming development environment may enable the user to select the desired remote computer systems based on any of various properties of the remote computer systems.

For example, in one embodiment the remote computer systems may be selected based on their physical locations. For example, as described above, in one embodiment the remote computer systems may be sensor devices 52 that are spatially distributed. The graphical programming development environment may allow the user to select the desired sensor devices 52 according to location criteria, such as which building they are located in, which floor of the building they are located on, their GPS coordinates, etc. As another example, the sensor devices 52 may be selected according to their type, e.g., which vendor they are manufactured by or their model number. As another example, the sensor devices 52 may be selected according to their resources, such as the amount of available memory or battery power.

As discussed above, in other embodiments the remote computer systems may comprise any of various other types of computer systems or computing devices. The user may select the desired remote computer systems or computing devices on which to deploy the second graphical program based on location, device type, device resources, or any of various other properties.

In various embodiments the user input selecting the remote computer systems on which to deploy the second graphical program may be received by the graphical programming development environment in various ways. For example, in one embodiment the graphical programming development environment may be operable to display a graphical user interface dialog or window allowing the user to select the remote computer systems. In another embodiment the user may configure the block diagram of the first graphical program or the block diagram of the second graphical program to select the desired remote computer systems.

In 305, the graphical programming development environment may automatically deploy the second graphical program to the selected remote computer systems. For example, the user may select a menu item or provide other input to the graphical programming development environment requesting the second graphical program to be deployed to the selected remote computer systems. In response, the graphical programming development environment may communicate with each of the remote computer systems selected in 303 in order to send the second graphical program to each remote computer system. Each of the remote computer systems may store the second graphical program in response to the communication with the graphical programming development environment in 305.

In 307, the first graphical program may be executed on the host computer system 82. As described above, in one embodiment the host computer system 82 may be the same as the development computer system 81 used to create the graphical programs. In another embodiment the first graphical program may be deployed for execution on a different computer system 82. In one embodiment the user may select a target computer system to serve as the host computer system 82, and the graphical programming development environment may be operable to automatically deploy the first graphical program on the host computer system 82.

In 309, the second graphical program may be executed on the remote computer systems. In other words, each remote computer system on which the second graphical program was deployed in 305 may execute a respective instance of the second graphical program.

In various embodiments the remote computer systems may begin executing the second graphical program at various times with respect to the beginning of execution of the first graphical program on the host computer system 82. For example, in one embodiment the first graphical program may be operable to broadcast a command to each remote computer system during execution of the first graphical program. For example, where the first graphical program comprises a graphical data flow program, the first graphical program may broadcast the command when the data inputs for a particular node within the graphical program become ready. The command from the first graphical program may request each remote computer system to initiate execution of the second graphical program. In this embodiment each remote computer system may receive the command at substantially the same time (possibly with a small variation in the receive times, e.g., due to network latencies). Thus, the remote computer systems may begin executing their respective instances of the second graphical program at substantially the same time, and the instances of the second graphical program may execute in parallel with each other.

In another embodiment the first graphical program may be operable to broadcast a command to each remote computer system at the same time the first graphical program begins execution. In this embodiment the remote computer systems may begin executing their respective instances of the second graphical program at substantially the same time with respect to each other and also at substantially the same time with respect to the first graphical program.

In another embodiment, rather than broadcasting the execution commands to the remote computer systems such that they all start executing their respective instances of the second graphical program together, the first graphical program may individually send a command to each remote computer system requesting the remote computer system to initiate execution of its respective instance of the second graphical program. For example, the first graphical program may cause the instances of the second graphical program to execute on the remote computer systems in a serial manner such that one remote computer system initiates execution of its instance of the second graphical program as the execution of another instance of the second graphical program on another remote computer system completes. As another example, the first graphical program may send the execution commands to the remote computer systems according to a staggered time interval, e.g., such that respective instances of the second graphical program begin execution every N time units.

In another embodiment the first graphical program may not control execution of the second graphical program instances on the remote computer systems. For example, each remote computer system may immediately begin executing the second graphical program in response to the second graphical program being deployed on the remote computer system. As another example, the graphical programming development environment may provide a graphical user interface enabling a user to individually start and stop execution of the second graphical program instances on the respective remote computer systems in response to user input.

As noted above, the first graphical program may be configured to exchange data with the second graphical program. Thus, as indicated in 311, the first graphical program may execute to exchange data with the instances of the second graphical program executing on the remote computer systems. Exemplary embodiments of 311 are described below.

Figure 10:
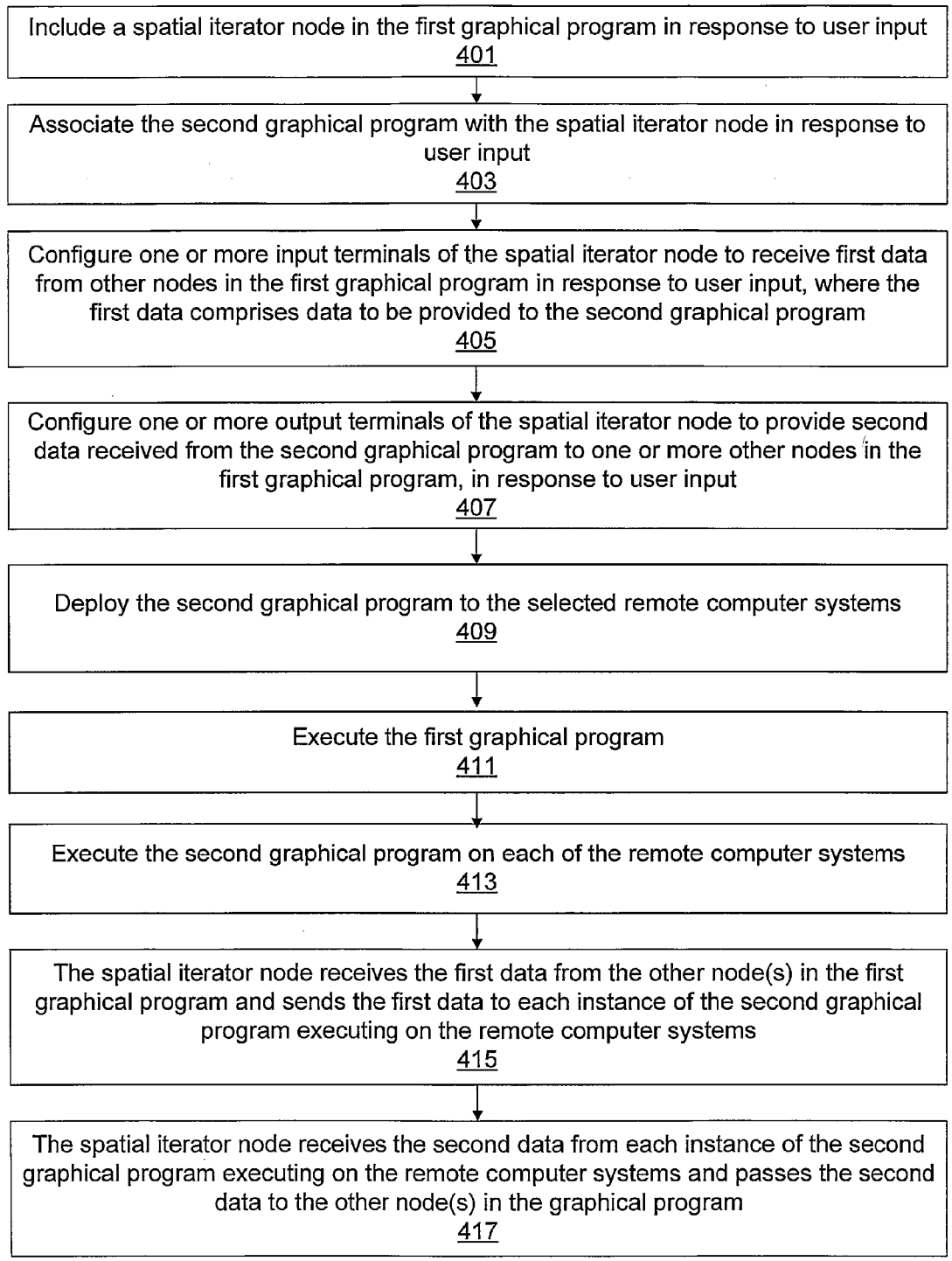
FIG. 10 is a flowchart diagram illustrating a more detailed embodiment of the method of FIG. 9.

FIG. 10 is a flowchart diagram illustrating a more detailed embodiment of the method of FIG. 9. It is noted that FIG. 10 illustrates a representative embodiment, and alternative embodiments are contemplated. Also, various elements may be combined, omitted, or performed in different orders.

As described above, the user may create a first block diagram for the first graphical program by including a plurality of nodes in the first block diagram. In some embodiments, the user may include a node referred to herein as a "spatial iterator" node in the first block diagram, as indicated in 401. The user may also associate the second graphical program with the spatial iterator node, as indicated in 403. The spatial iterator node may comprise a specialized node that represents execution of the second graphical program on a plurality of remote computer systems. For example, the spatial iterator node may have a visual appearance that visually indicates that the second graphical program associated with the spatial iterator node executes on a plurality of remote computer systems.

As known in the programming arts, iteration structures such as While loops and For loops represent a portion of code to be performed for multiple iterations. As described above, the second graphical program may represent a portion of graphical code to be executed multiple times. However, instead of executing the graphical code of the second graphical program for multiple iterations sequentially in time on a single computer system, the graphical code of the second graphical program is executed a single time by a plurality of remote computer systems. Thus, in a sense, iterations of the second graphical program are performed, where the iterations are separated in space (i.e., occurring on different devices). Hence the term "spatial iterator node".

Figure 11:
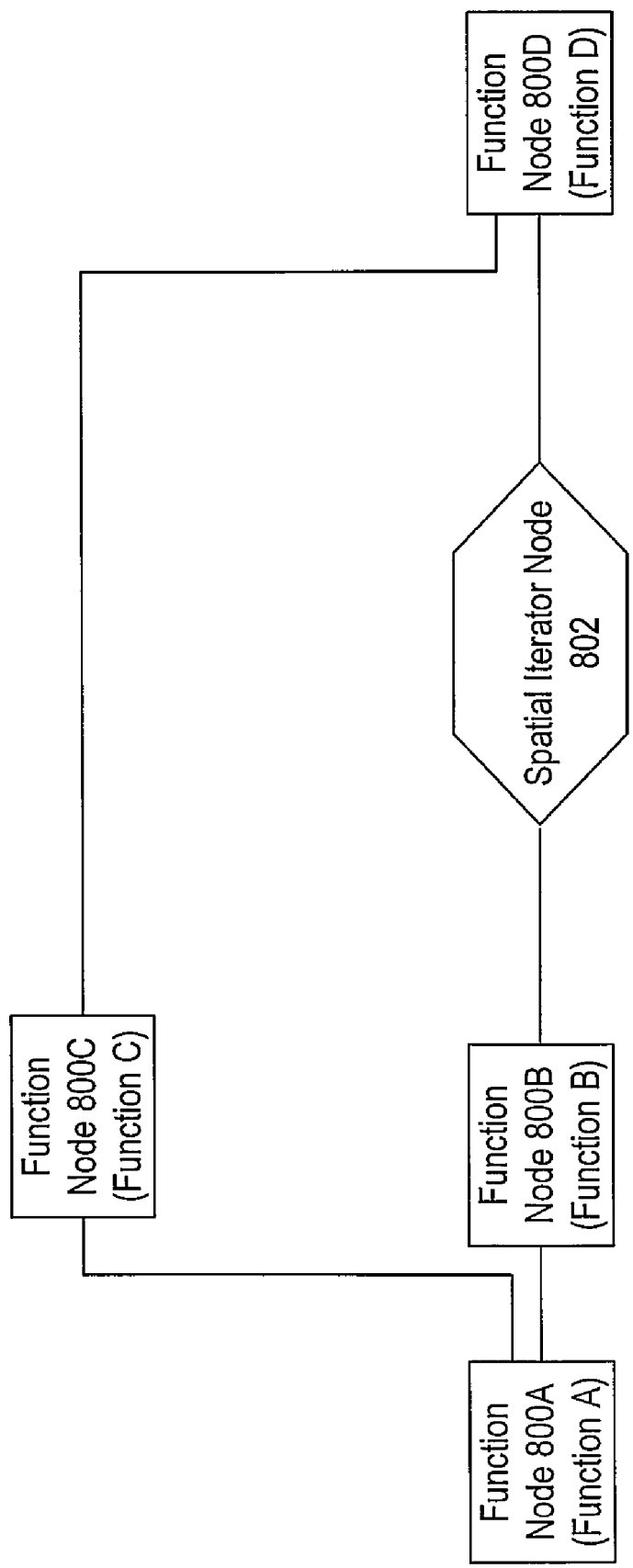
FIG. 11 illustrates an example of a first block diagram for a first graphical program, according to one embodiment.

FIG. 11 illustrates an example in which the user has created a first block diagram for a first graphical program, according to one embodiment. As shown the user has included various function nodes 800 in the first block diagram. For example, function node 800A performs a function A, function node 800B performs a function B, etc. In this example, the first graphical program comprises a graphical data flow program, and the nodes are connected according to a data flow representation. For example, the wire connecting function node 800A to function node 800B indicates that data produced by function node 800A is used by function node 800B.

The user has also included a spatial iterator node 802 in the first block diagram for the first graphical program and associated a second graphical program with the spatial iterator node 802. As described above, the second graphical program has a second block diagram representing functionality of the second graphical program. In this embodiment, the second block diagram of the second graphical program is not visible in the first block diagram for the first graphical program. Instead, the spatial iterator node 802 acts as a placeholder for the second graphical program. For example, the user may double-click on the spatial iterator node 802 or provide other input to cause the graphical programming development environment to display a separate window in which the second block diagram for the second graphical program can be viewed and edited.

Figure 12:
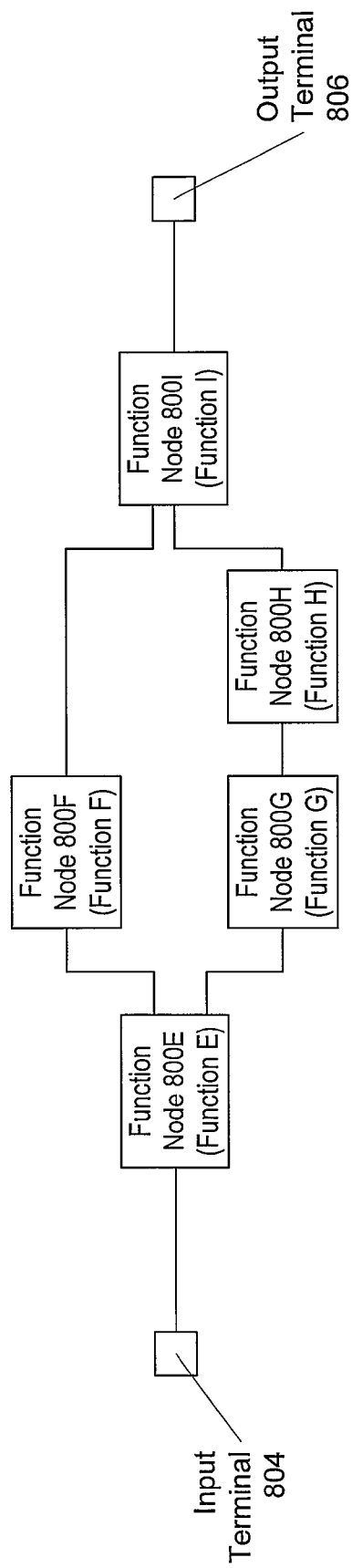
FIG. 12 illustrates an example of a second block diagram for a second graphical program, according to one embodiment.

For example, FIG. 12 illustrates a second block diagram that the user has created for the second graphical program. The second block diagram includes various function nodes 800, similarly as the first block diagram. The function nodes 800 in the second graphical program are connected according to a data flow representation in order to visually indicate functionality performed by the second graphical program.

Thus, in the embodiment illustrated in FIGS. 11 and 12, the spatial iterator node 802 displayed in the first block diagram for the first graphical program effectively encapsulates the second block diagram for the second graphical program. The second block diagram for the second graphical program is not visible within the first block diagram for the first graphical program. Instead, the second block diagram is represented by a single node, i.e., the spatial iterator node 802. The second block diagram is separately displayable from the first block diagram, e.g., is displayable in a separate window.

The second block diagram for the second graphical program also includes an input terminal 804 representing input received from the first block diagram for the first graphical program. For example, as shown in FIG. 11, data is passed from the function node 800B to the spatial iterator node 802. The input terminal 804 in the second block diagram represents the data passed to the spatial iterator node 802, i.e., the data passed from the function node 800B in the first block diagram for the first graphical program.

Similarly, the second block diagram for the second graphical program also includes an output terminal 806 representing output passed from the second block diagram for the second graphical program to the first block diagram for the first graphical program. In this example, the output of the function node 800I is passed to the output terminal 806. The connection between the spatial iterator node 802 and the function node 800D in FIG. 11 represents the data passed from the function node 800I in the second block diagram to the function node 800D in the first block diagram.

The spatial iterator node 802 may have an appearance that distinguishes it from other nodes in the first block diagram. For example, in FIG. 11, the spatial iterator node 802 has a hexagonal shape, whereas the function nodes 800 have a rectangular shape. In other embodiments the spatial iterator node 802 may be visually distinguished from the other nodes in the first graphical program in various other ways, e.g., through the use of textual and/or graphical information.

The distinct appearance of the spatial iterator node 802 may visually indicate to the user that the spatial iterator node 802 represents a second graphical program to be executed on a plurality of remote computer systems. The data connections between the other nodes in the first graphical program and the spatial iterator node 802 may visually indicate the data exchange between the first graphical program and the second graphical program that executes on the remote computer systems.

Figure 13:
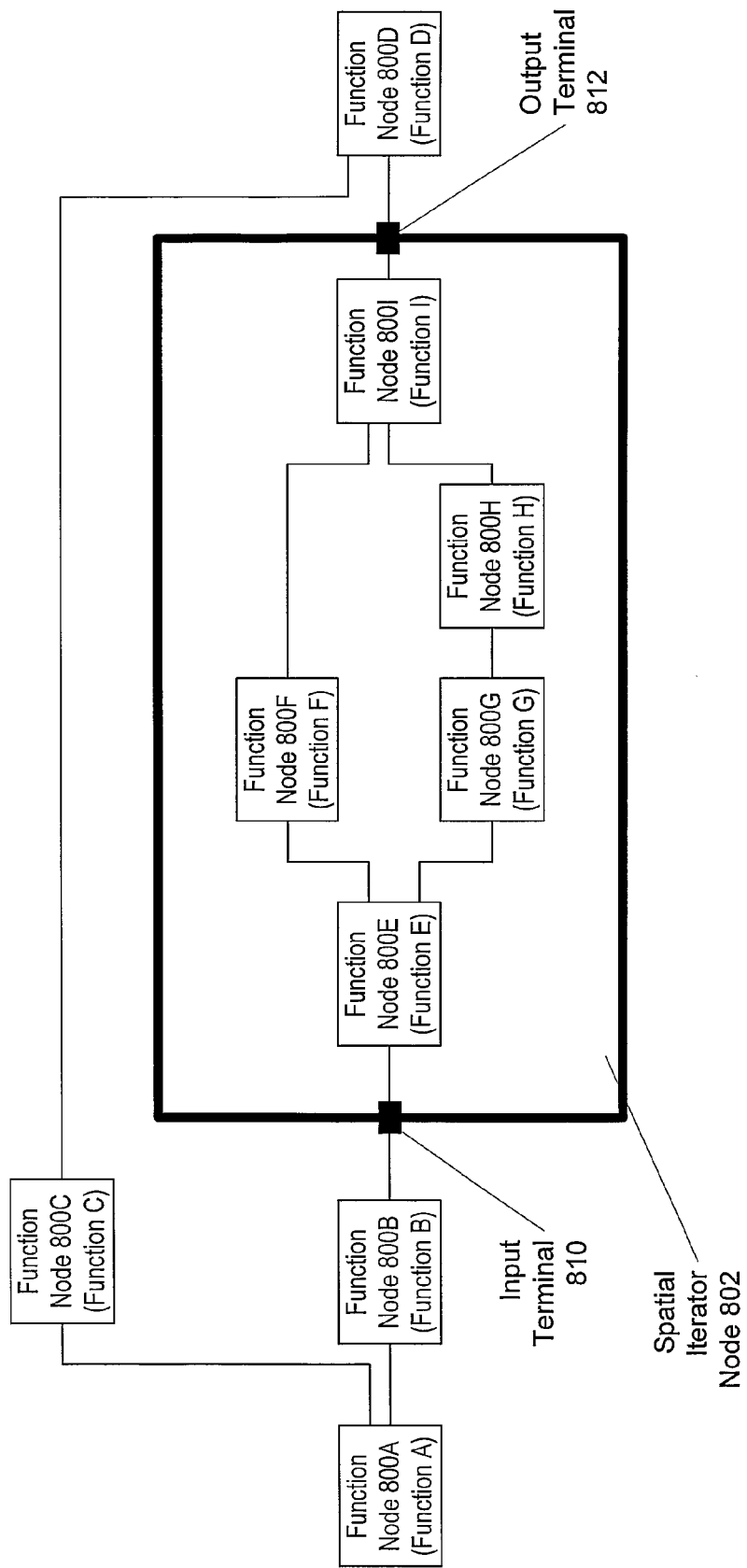
FIG. 13 illustrates an example in which the first block diagram for the first graphical program and the second block diagram for the second graphical program are displayed in a single block diagram.

FIG. 13 illustrates another embodiment of the first graphical program and the second graphical program. In this embodiment, the first graphical program and the second graphical program are both represented in a single block diagram. More particularly, in this embodiment the second block diagram for the second graphical program is displayed as a sub-diagram within the spatial iterator node 802. The spatial iterator node 802 in FIG. 13 has a border, e.g., similar to the border of a While loop structure node or a For loop structure node in the LabVIEW graphical programming development environment. The user creates the second block diagram for the second graphical program by arranging the nodes of the second block diagram inside the rectangular loop border of the spatial iterator node 802.

Thus, in the embodiment of FIG. 13, the first block diagram for the first graphical program includes the second block diagram for the second graphical program. Thus, a single block diagram illustrates the functionality of both the first graphical program that executes on the host computer system 82 and the second graphical program that executes on the plurality of remote computer systems 84. The visual appearance of the spatial iterator node 802 indicates to the user that the graphical code inside the spatial iterator node 802 (i.e., the second block diagram) executes on the remote computer systems 84.

FIG. 13 also illustrates data exchange between the first graphical program and the second graphical program. For example, the wire between the function node 800B and the function node 800E visually indicates that output from the function node 800B in the first graphical program executing on the host computer 82 is passed as input to the function node 800E in each instance of the second graphical program executing on the remote computer systems 84. In this example, the data is passed via an input terminal 810 of the spatial iterator node 802. Similarly, the wire between the function node 800I and the function node 800D visually indicates that output from the function node 800I in each instance of the second graphical program executing on the remote computer systems 84 is passed as input to the function node 800D in the first graphical program executing on the host computer system 82. In this example, the data is passed via an output terminal 812 of the spatial iterator node 802.

Referring again now to FIG. 10, in 405, one or more input terminals of the spatial iterator node 802 may be configured to receive first data from other nodes in the first graphical program, where the first data represents data to be provided to the second graphical program. For example, as shown in FIGS. 11 and 13, a wire is connected from an output terminal of the function node 800B to an input terminal of the spatial iterator node 802.

In 406, one or more output terminals of the spatial iterator node 802 may be configured to provide second data received from the second graphical program to one or more other nodes in the first graphical program. For example, as shown in FIGS. 11 and 13, a wire is connected from an output terminal of the spatial iterator node 802 to an input terminal of the function node 800D.

In 409, the second graphical program may be deployed to the selected remote computer systems, as described above with reference to FIG. 9.

In 411, the first graphical program may be executed on the host computer system 82, as described above with reference to FIG. 9.

In 413, the second graphical program may be executed on each of the remote computer systems 84, as described above with reference to FIG. 9. As described above, in some embodiments the first graphical program may be operable to initiate the execution of the second graphical program instances on the remote computer systems 84. For example, in one embodiment the first graphical program may broadcast a command to the remote computer systems 84 to cause them to begin executing their respective instances of the second graphical program when all of the data inputs connected to the spatial iterator node 802 become ready.

In 415, the spatial iterator node 802 receives the first data from the other node(s) in the first graphical program and sends the first data to each instance of the second graphical program executing on the remote computer systems. For example, the data inputs may be sent to each instance of the second graphical program along with the command instructing them to begin execution.

In 417, the spatial iterator node 802 receives the second data from each instance of the second graphical program executing on the remote computer systems and passes the second data to the other node(s) in the graphical program. Thus, each instance of the second graphical program executing on a remote computer system may generate output data. The output data may be sent to the spatial iterator node 802 in the first graphical program, which may aggregate the output data. The aggregated output data may be passed to other nodes in the first graphical program, e.g., nodes wired to receive the aggregated data from the output terminal of the spatial iterator node 802.

Figure 14:
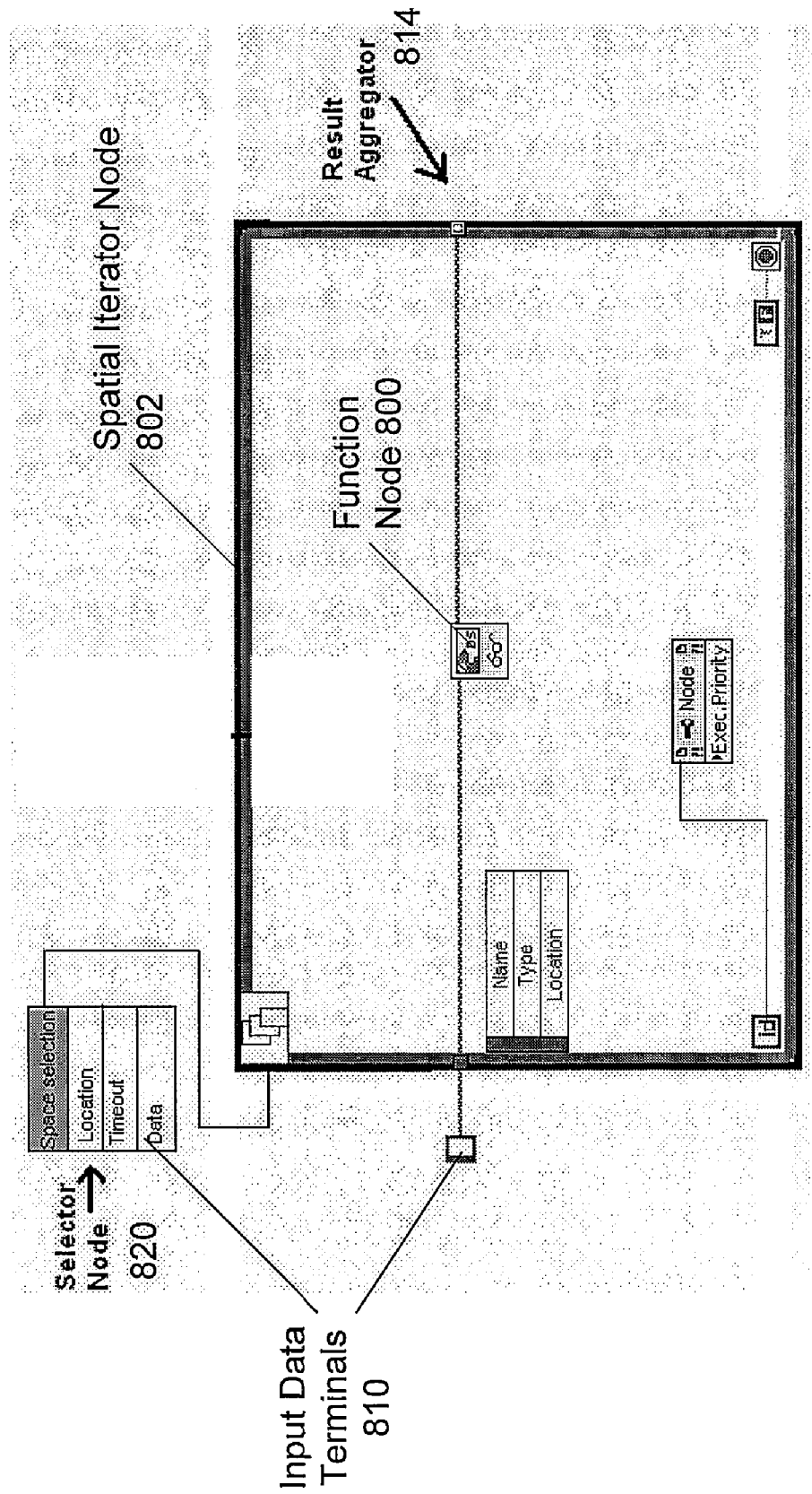
FIG. 14 illustrates an exemplary embodiment of a spatial iterator node.

As described above with reference to FIG. 13, in one embodiment the second graphical program to be executed on the remote computer systems 84 may be displayed inside of a spatial iterator node 802 that is included in the first graphical program. FIG. 14 illustrates an exemplary embodiment of the spatial iterator node 802 in FIG. 13 in more detail. In this example, the graphical code for the second graphical program includes a single function node 800.

As shown, the spatial iterator node 802 includes input data terminals 810 to which data from other nodes in the first graphical program may be wired. The spatial iterator node 802 also includes a result aggregator output terminal 812 from which aggregated data representing output of the plurality of instances of the second graphical program executing on the remote computer systems may be passed to other nodes in the first graphical program.

In this example of FIG. 14, the spatial iterator node 802 also has an associated selector node 820. The selector node 820 is used to select which remote computer systems to deploy the second graphical program on. For example, the user may connect data wires to the selector node 820 to specify properties of the desired remote computer systems to select for execution of the second graphical program, such as their location, device type, resources, etc. For example, the user may connect information to the selector node 820 specifying that the second graphical program is to be executed by all QBX devices on a particular floor of a building capable of reading a temperature. Other types of constraints may also be specified, such as available battery power above a certain threshold.

Another parameter configurable via the selector node 820 is a timeout value. If it is not the case that all remote devices have finished executing their instance of the second graphical program within this time, then the spatial iterator node 802 may return with the values from the devices that did complete on the output tunnels.

The border of the spatial iterator node 802 indicates communication between the first graphical program containing the spatial iterator node 802 and the instances of the second graphical program executing on the remote computer systems 84. In one embodiment, the input data terminal 810 on the left side of the border may be non-indexing, so that all the instances of the second graphical program receive the same data wired to this input terminal. The input data terminal 810 of the selector node 820 may be used to pass data to the instances of the second graphical program on an individual basis. For example, the data may be indexed so that each instance of the second graphical program receives a different input value. Similarly, the output from the result aggregator 814 may be indexed, since the respective instances of the second graphical program may return different output values.

The spatial iterator node in FIG. 14 also includes two terminals similar to the loop index and the loop termination of a LabVIEW While loop structure node. The loop index terminal may produce a device ID reference that can be used in property nodes to get more detailed device specific information about the device the instance of the second graphical program is running on. The loop termination if set to true will stop all instances of the second graphical program running on all remote devices. For example, this may serve as a way to specify that once one instance of the second graphical program on one device completes, then all the other instances of the second graphical program should stop executing.

In one embodiment, spatial iterator nodes 802 may be nested. For example, one spatial iterator node 802 may be placed inside of another one. The graphical code portion inside the nested spatial iterator node may run on devices that are connected only or primarily to the device running the parent graphical code portion.

Compile Time Handling

In one embodiment the second graphical program displayed within the spatial iterator node 802 may be automatically extended through scripting when the first graphical program containing the spatial iterator node 802 is compiled. For example, other graphical code (e.g., nodes) may be automatically added to turn the second graphical program into a complete graphical program that can be executed on the remote computer systems 84 to perform the data exchange with the host computer system 82 as described above. The extended second graphical program may then be compiled to the various target device types that are specified by the selector node.

Figure 15:
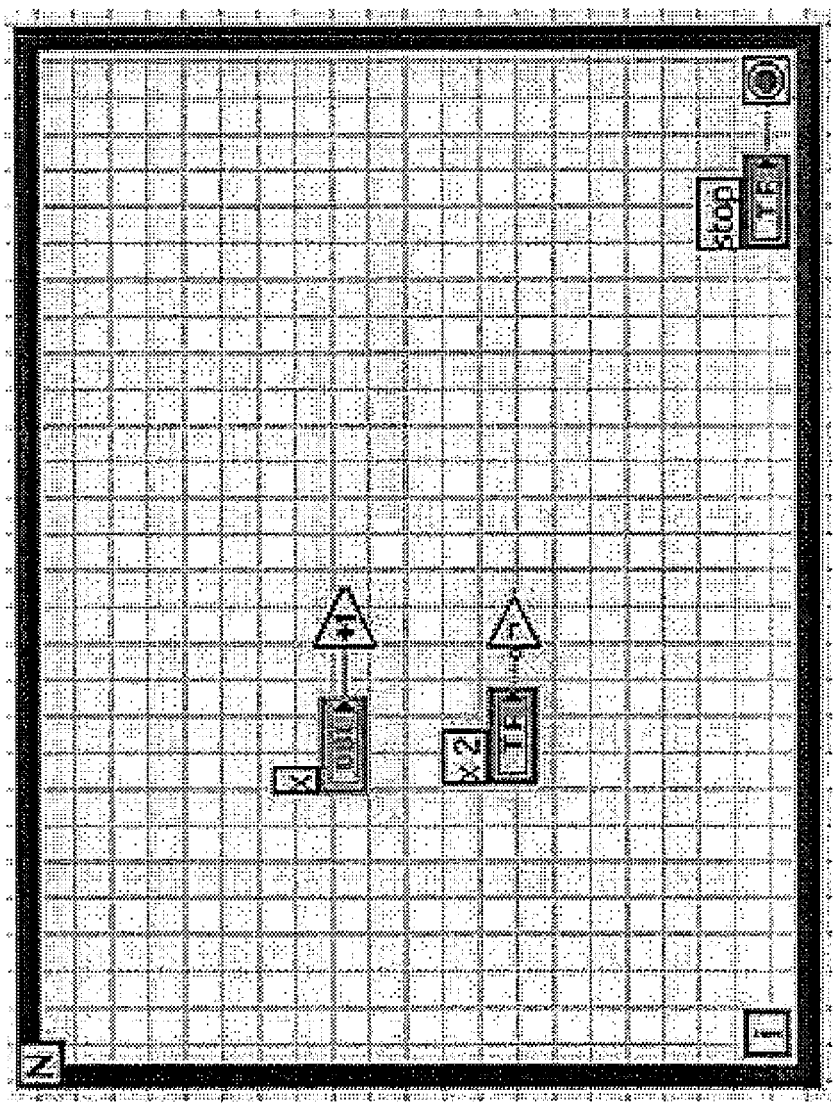
FIG. 15 illustrates a first graphical program including the spatial iterator node of FIG. 14, where a second graphical program is displayed in the spatial iterator node.
Figure 16:
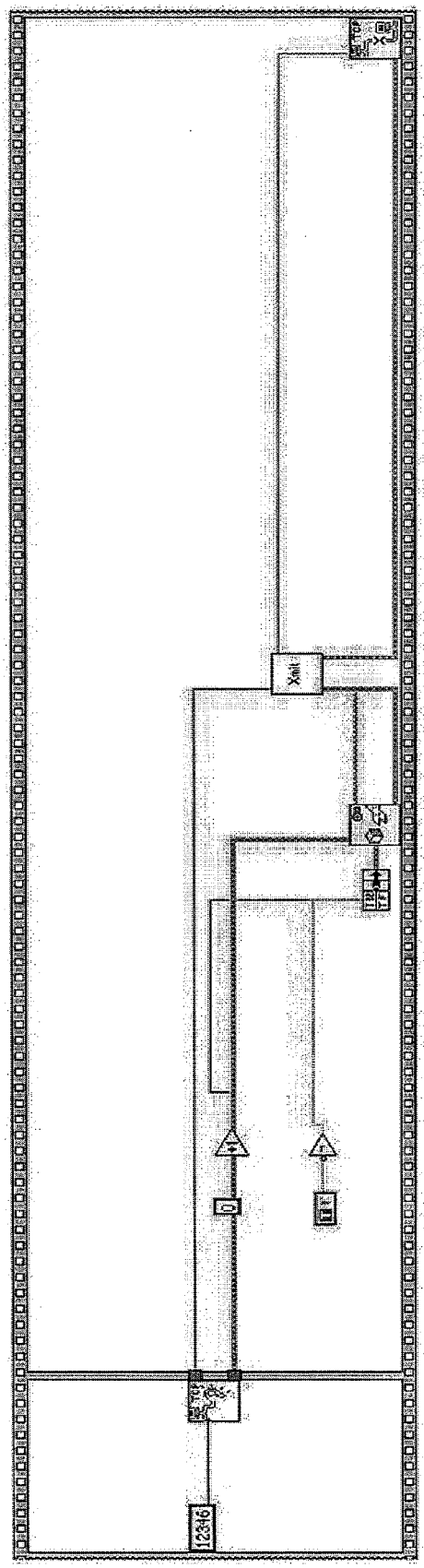
FIG. 16 illustrates the second graphical program of FIG. 15 after being automatically extended to include additional graphical code for communicating with the first graphical program.

For example, FIG. 15 illustrates an exemplary spatial iterator node 802 included in a first graphical program. In this case, the first graphical program does not include any other nodes besides the spatial iterator node 802. As shown, four nodes have been placed inside the spatial iterator node 802 by the user, where the four nodes represent the second graphical program to be executed on the remote devices. When the first graphical program containing the spatial iterator node 802 is compiled, the second graphical program may be automatically extended through scripting to automatically produce the complete graphical program illustrated in FIG. 16. The graphical program of FIG. 16 includes a sequence structure with two frames. The first frame simply waits until a start signal or command has been received from the host computer system 82. Once the start command has been received, execution proceeds to the second frame. The graphical code portion that was placed inside the spatial iterator node 802 by the user is executed in the second frame, and its output is sent to the first graphical program executing on the host computer 82.

Figure 17:
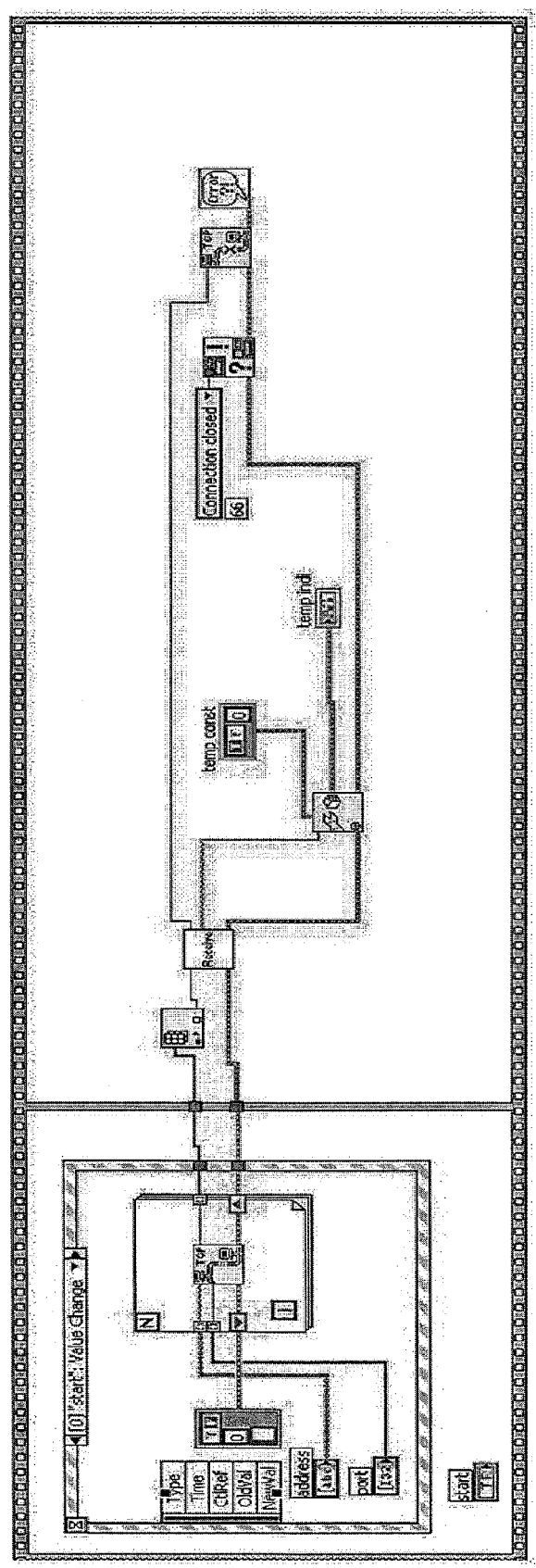
FIG. 17 illustrates the first graphical program of FIG. 15 after being automatically extended to include additional graphical code for communicating with the second graphical program.

The first graphical program that includes the spatial iterator node 802 may also be automatically extended through scripting. For example, the first graphical program of FIG. 15 may be automatically extended to produce the graphical program shown in FIG. 17. The graphical program of FIG. 17 includes graphical code to perform communication to send the start signal to, send initial data to, and receive the output results from the graphical program of FIG. 16 executing on the remote devices.

Deployment

The location filter parameter in the selector node 820 is used to determine which devices the second graphical program (or automatically extended second graphical program) will be sent to. The second graphical program is deployed to the selected target devices (e.g., remote computer systems 84).

Execution

The second graphical program on each remote target device 84 starts running upon receiving a signal from the host computer system 82 (indicating that the spatial iterator node 802 on the host computer system 82 has started). The timing of the instances of the second graphical program can be synchronized with each other and/or with the first graphical program via clocks on the devices integrated with a timed loop.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for creating a distributed application that uses a first graphical program and a second graphical program, the method comprising:
    displaying a first plurality of interconnected nodes in the first graphical program, wherein the first graphical program is stored on a first computer system, wherein the first plurality of interconnected nodes visually indicate functionality of the first graphical program, wherein the first plurality of interconnected nodes includes a first node;
    configuring the first node with information selecting a plurality of computer systems to which to deploy the second graphical program, wherein the plurality of computer systems are coupled to the first computer system;
    automatically deploying the second graphical program to the plurality of computer systems;
    displaying the second graphical program within the first node, wherein the second graphical program comprises a second plurality of interconnected program nodes that indicate the functionality of the second graphical program and are visible within the first node in the first graphical program, wherein the first node is configured to automatically invoke execution of a different respective instance of the second graphical program on each respective computer system of the plurality of computer systems coupled to the first computer system, wherein the second plurality of interconnected nodes does not include any nodes representing the plurality of computer systems coupled to the first computer system; and
    executing the first graphical program on the first computer system, wherein executing the first graphical program comprises executing the first node, wherein the first node executes to invoke execution of the respective deployed instances of the second graphical program, wherein each instance of the second graphical program is invoked on one of the plurality of computer systems coupled to the first computer system, wherein during execution each instance of the second graphical program provides data to the first node in the first graphical program.

2. The method of claim 1,
    wherein the plurality of instances of the second graphical program are executed in parallel by the plurality of computer systems coupled to the first computer system.

3. The method of claim 1,
    wherein the first plurality of interconnected nodes also includes a second node;
    wherein the method further comprises displaying a wire from the second node to the first node;
    wherein the first node executes to receive data via the wire from the second node and pass the data as input to each respective instance of the second graphical program.

4. The method of claim 1,
    wherein the first plurality of interconnected nodes also includes a second node;

wherein the method further comprises displaying a wire from the first node to the second node;
wherein the first node executes to pass the data received from each respective instance of the second graphical program to the second node in the first graphical program via the wire.

5. The method of claim 1, further comprising:
displaying a second diagram for the second graphical program within the first node, wherein the second diagram for the second graphical program is visible as a sub-diagram in the first diagram for the first graphical program.

6. The method of claim 1, further comprising:
selecting the plurality of computer systems in response to user input.

7. The method of claim 4,
wherein the first node is configured to aggregate the respective data received from the respective instances of the second graphical program, wherein passing the data from each instance of the second graphical program to the second node comprises passing the aggregated data to the second node.

8. The method of claim 1, further comprising:
receiving user input associating the second graphical program with the first node.

9. The method of claim 8, further comprising:
wherein the first node includes a border;
wherein the second graphical program includes a second plurality of interconnected nodes;
wherein the user input associating the second graphical program with the first node comprises user input causing the second plurality of interconnected nodes of the second graphical program to be displayed within the border of the first node.

10. The method of claim 1,
wherein each respective computer system on which a respective instance of the second graphical program is invoked comprises a respective sensor device in a wireless communication network.

11. The method of claim 6,
wherein said selecting the plurality of computer systems in response to user input comprises selecting the plurality of computer systems in response to user input specifying a physical location of the plurality of computer systems.

12. The method of claim 6,
wherein said selecting the plurality of computer systems in response to user input comprises selecting the plurality of computer systems in response to user input configuring one or more nodes of the first graphical program with information specifying one or more properties identifying the plurality of computer systems.

13. A non-transitory computer-readable memory medium storing program instructions executable to configure a distributed application that uses a first graphical program and a second graphical program, wherein the program instructions are executable to:
display a first plurality of interconnected nodes in the first graphical program, wherein the first graphical program is stored on a first computer system, wherein the first plurality of interconnected nodes visually indicate functionality of the first graphical program, wherein the first plurality of interconnected nodes includes a first node;
configure the first node with information selecting a plurality of computer systems to which to deploy the second graphical program, wherein the plurality of computer systems are coupled to the first computer system;
automatically deploy the second graphical program to the plurality of computer systems;
display the second graphical program within the first node, wherein the second graphical program comprises a second plurality of interconnected program nodes that indicate the functionality of the second graphical program and are visible within the first node in the first graphical program, wherein the first node is configured to automatically invoke execution of a different respective instance of the second graphical program on each respective computer system of the plurality of computer systems coupled to the first computer system, wherein the second plurality of interconnected nodes does not include any nodes representing the plurality of computer systems coupled to the first computer system; and
execute the first graphical program on the first computer system, wherein executing the first graphical program comprises executing the first node, wherein the first node executes to invoke execution of the respective deployed instances of the second graphical program, wherein each instance of the second graphical program is invoked on one of the plurality of computer systems coupled to the first computer system, wherein during execution each instance of the second graphical program provides data to the first node in the first graphical program.

14. The non-transitory computer-readable memory medium of claim 13,
wherein the first plurality of interconnected nodes also includes a second node;
wherein the program instructions are further executable to:
receive user input causing a wire to be displayed from the second node to the first node; and
in response to the user input causing the wire to be displayed, configure the first node to execute to receive data via the wire from the second node and pass the data as input to each respective instance of the second graphical program.

15. The non-transitory computer-readable memory medium of claim 13,
wherein the first plurality of interconnected nodes also includes a second node;
wherein the program instructions are further executable to:
receive user input causing a wire to be displayed from the first node to the second node; and
in response to the user input causing the wire to be displayed, configure the first node to pass the data received from each respective instance of the second graphical program to the second node in the first graphical program via the wire.

16. The non-transitory computer-readable memory medium of claim 15, wherein the program instructions are further executable to:
configure the first node to aggregate the respective data received from the respective instances of the second graphical program, wherein passing the data from each instance of the second graphical program to the second node comprises passing the aggregated data to the second node.

17. The non-transitory computer-readable memory medium of claim 13, wherein the program instructions are further executable to:
display a second diagram for the second graphical program within the first node, wherein the second diagram for the second graphical program is visible as a sub-diagram in the first diagram for the first graphical program.

18. The non-transitory computer-readable memory medium of claim 13, wherein the program instructions are further executable to:

select the plurality of computer systems in response to user input.

19. A system for configuring a distributed application that uses a first graphical program and a second graphical program, the system comprising:

a first computer system; and a plurality of computer systems coupled to the first computer system;

wherein the first computer system is configured to execute program instructions executable to:

display a first plurality of interconnected nodes in the first graphical program, wherein the first graphical program is stored on the first computer system, wherein the first plurality of interconnected nodes visually indicate functionality of the first graphical program, wherein the first plurality of interconnected nodes includes a first node;

configure the first node with information selecting the plurality of computer systems to which to deploy the second graphical program;

automatically deploy the second graphical program to the plurality of computer systems;

display the second graphical program within the first node, wherein the second graphical program comprises a second plurality of interconnected program nodes that indicate the functionality of the second graphical program and are visible within the first node in the first graphical program, wherein the first node is configured to automatically invoke execution of a different respective instance of the second graphical program on each respective computer system of the plurality of computer systems coupled to the first computer system, wherein the second plurality of interconnected nodes does not include any nodes representing the plurality of computer systems coupled to the first computer system; and execute the first graphical program on the first computer system, wherein executing the first graphical program comprises executing the first node, wherein the first node executes to invoke execution of the respective deployed instances of the second graphical program, wherein each instance of the second graphical program is invoked on one of the plurality of computer systems coupled to the first computer system, wherein during execution each instance of the second graphical program provides data to the first node in the first graphical program.

* * * * *